United States Patent [19]

Stone

[11] 4,085,685

[45] Apr. 25, 1978

[54] END FITTING

[75] Inventor: Thomas G. Stone, Farmington, Mich.

[73] Assignee: Evans Products Company, Portland, Oreg.

[21] Appl. No.: 532,908

[22] Filed: Dec. 16, 1974

Related U.S. Application Data

[63] Continuation of Ser. No. 328,929, Feb. 2, 1973, abandoned.

[51] Int. Cl.² .............................................. B60P 7/08
[52] U.S. Cl. .................................................. 105/498
[58] Field of Search ................................ 105/497–502

[56] References Cited

U.S. PATENT DOCUMENTS

| 2,769,404 | 11/1956 | Dietrichson | 105/501 |
| 3,165,075 | 1/1965 | Miller | 105/501 |
| 3,782,295 | 1/1974 | Balinski | 105/502 |
| 3,799,070 | 3/1974 | Munson | 105/501 |

*Primary Examiner*—Drayton E. Hoffman
*Assistant Examiner*—Donald W. Underwood
*Attorney, Agent, or Firm*—Harness, Dickey & Pierce

[57] ABSTRACT

A freight bracing device such as a cross bar embodying an improved end fitting that permits attachment to either of two types of belt rails. In one type of belt rail which has an angular configuration with perforations along the horizontally extending portion, the end fitting has a first portion that enters into the perforations to fix the cross bar against longitudinal movement. A sliding latch is engageable under the horizontal leg to prevent vertical disengagement. The other type of belt rail has a vertically upstanding leg spaced from the adjacent side wall and another vertical portion in which longitudinally spaced apertures are formed. The first portion of the end fitting is adapted to be supported on and received behind the upstanding leg of this type of belt rail to prevent transverse disengagement. A pivoted latch has a portion that is adapted to enter into the apertures of this second type of belt rail to hold the end fitting against vertical and longitudinal displacement.

2 Claims, 2 Drawing Figures

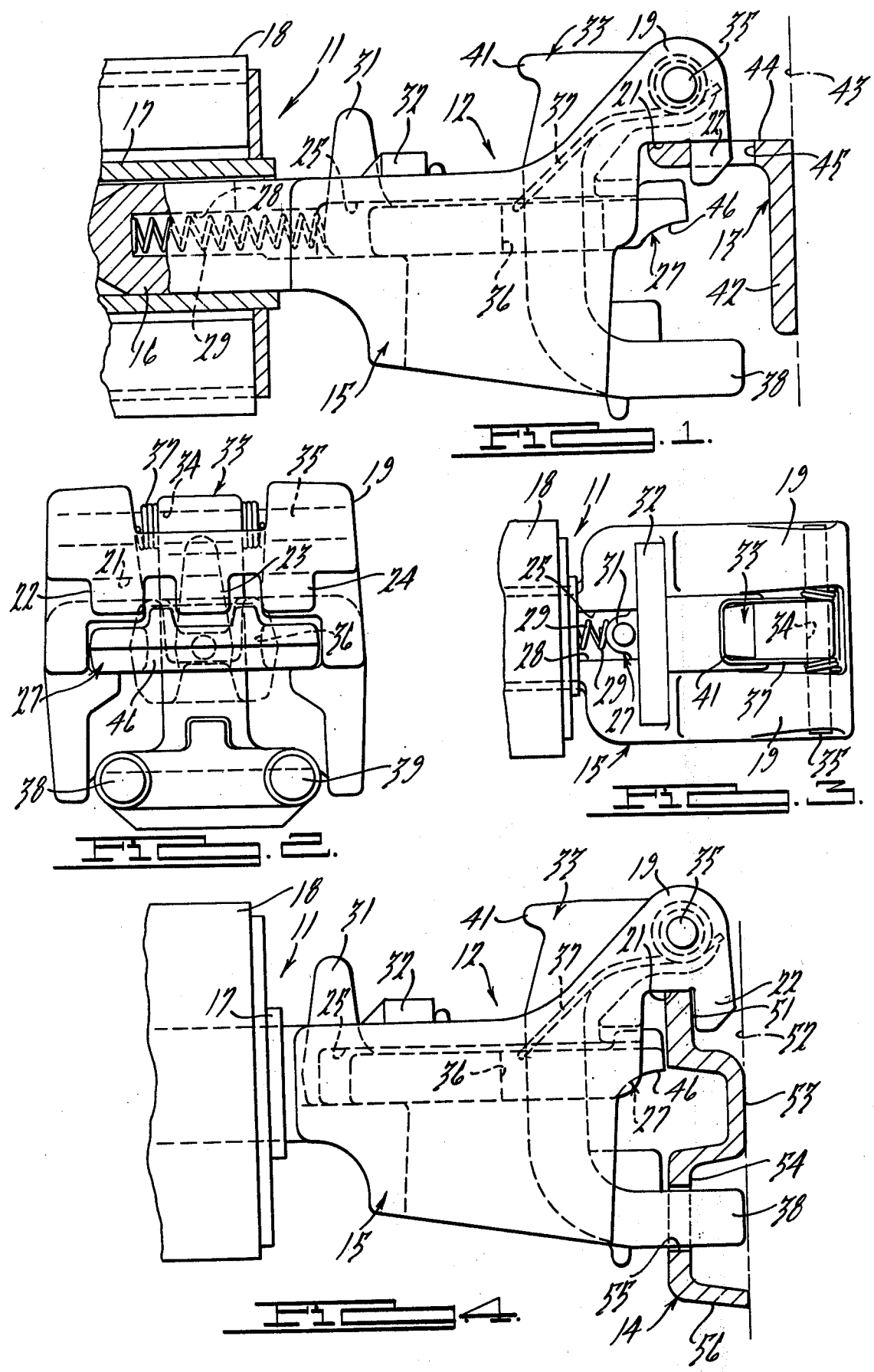

END FITTING

This ia a continuation, of application Ser. No. 328,929, filed Feb. 2, 1973 and now abandoned.

BACKGROUND OF THE INVENTION

This invention relates to a freight bracing device and more particularly to an improved end fitting for such a device that is adapted for use with various types of belt rails. A great number of railway cars are equipped with bracing devices that include wall mounted belt rails and cross bars or similar units having end fittings that afford a detachable connection to the belt rails. One type of arrangement that has enjoyed a wide degree of commercial acceptance is the type of belt rail and end fitting shown in Tobin et al U.S. Pat. No. 2,725,826, issued Dec. 6, 1955 and entitled "Freight Loading Apparatus." Another type of belt rail and end fitting which, more recently, has enjoyed a large degree of application is shown in Dunlap U.S. Pat. No. 3,071,086, issued Jan. 1, 1963 and entitled "Freight Bracing Apparatus." The belt rails and, accordingly, the cooperating end fittings of these two bracing systems are considerably different and, therefore, not interchangeable. The use of two such dissimilar systems, although each has its own advantages, causes unnecessary duplication of parts and additional expense.

It is, therefore, a principal object of this invention to provide an improved end fitting for a freight bracing cross bar or the like that is usable with either of the aforenoted types of belt rails.

It is another object of the invention to provide an improved and simplified universal end fitting.

SUMMARY OF THE INVENTION

This invention is adapted to be embodied in an end fitting for detachably interconnecting a cross bar or the like to either of two types of belt rails. The first type of belt rail has a horizontally disposed leg with longitudinally spaced openings. The second type of belt rail has a vertical upstanding portion and a portion formed with longitudinally spaced openings in a vertical face thereof. The end fitting has at least one downwardly extending projection adapted to extend through selected apertures in the first type of belt rail to fix the end fitting longitudinally and transversely to the first type of belt rail. The downwardly extending projection is also adapted to extend behind the vertically upstanding projection of the second type of belt rail to fix the end fitting transversely to the second type. A first latch member is supported by the end fitting for movement between a latched position and a released position. In its latched position, the first member is adapted to underlie the horizontally disposed leg of the first type of belt rail for holding the end fitting against vertical movement relative to this type of belt rail. A second latch member is also supported by the end fitting for movement between a latched position and a released position. In its latched position the second latch member is adapted to enter selective of the apertures of the second type of belt rail to hold the end fitting against vertical and longitudinal movement relative to this type of belt rail.

BRIEF DESCRIPTION OF THE DRAWINGS

FIG. 1 is a side elevational view, with portions shown in section, of a freight bracing device embodying this invention and affixed to a first type of belt rail.

FIG. 2 is an end view of the end fitting shown in FIG. 1.

FIG. 3 is a top plan view of the end fitting.

FIG. 4 is a side elevational view, in part similar to FIG. 1, showing the device attached to a second type of belt rail.

DETAILED DESCRIPTION OF THE PREFERRED EMBODIMENT

A freight bracing cross bar embodying this invention is identified generally by the reference numeral 11 and carries an end fitting 12 at each of its ends. Since the end fitting 12 embodies the invention and the remaining portion of the cross bar forms no part of the invention, only one end is shown in detail. It is to be understood that the unshown end is identical in construction. The end fitting 12 is particularly adapted to affix the cross bar 11 to either a first type of belt rail, indicated by the reference numeral 13, (FIG. 1) or a second type of belt rail, indicated generally by the reference numeral 14, (FIG. 4). The end fitting 12 may, in addition to being used at opposite ends of a cross bar, be used in conjunction with other types of freight bracing devices that are adapted to be detachably affixed to belt rails or the like.

The end fitting 12 is comprised of a main body portion 15 that may be formed as a casting or forging and which has a shank portion 16 that is adapted to enter into a socket opening 17 formed at one end of the body of a cross bar 18. The shank portion 16 may be rigidly connected within the socket opening 17 or may be slidably supported within the socket opening 17, as is well known in this art.

The main body portion 15 is formed with an upwardly extending projection 19 the underside of which is formed with horizontally disposed surface 21. A plurality of projections 22, 23 and 24 extend downwardly at the outer end of the surface 21.

To the rear of the portion 19 the body member 15 is formed with an extending opening 25 in which a first latch member 27 is slidably supported. A smaller opening 28 is formed at the base of the opening 25, which opening extends into the shank portion 16 and receives a coil spring 29. The spring 29 urges the latch member 27 to an extended, latching position. The extremity of the movement in this direction is limited by an upstanding handle portion 31, integrally connected to the first latch member 27, which engages a stop bar 32 welded or otherwise affixed to the body member 15.

A second latch member, indicated generally by the reference numeral 33 is contained between a bifurcated part of the upstanding projection 19 and is formed with a bored opening 34 that receives a pivot pin 35 that is affixed to the portion 19 for pivotally supporting the latch member 33. The latch member 27 has an enlarged, generally rectangular shaped opening 36 through which the latch member 33 extends. The opening 36 is sized so as to permit free movement of each of the latch members 27 and 33 between their latched and released positions without interfering with the other. A torsional spring 37 encircles the pivot pin 35 and engages the latch member 33 to urge it to a latched position as shown in the Figures.

The lower end of the latch member 33 has a pair of pin like projections 38 and 39, for a reason which will become apparent. Furthermore, the upper portion of the latch member 33 has a knob like portion 41 that forms a handle so as to permit pivotal movement of the latch member 33 between the latched position and a released position.

The belt rail 13 (FIG. 1) is of a well known type sold under the trade name DF. The belt rail 13 comprises, generally, a structural angle having a vertically disposed leg 42 that is adapted to be affixed to the side wall 43 of a transporting vehicle, such as a railroad car. A horizontally extending leg 44 is integrally connected to the leg 42 and is formed with a plurality of longitudinally spaced apertures 45.

When used in conjunction with the belt rail 13, the end fitting 12 is appropriately positioned so that the projections 22, 23 and 24, which are appropriately spaced, line up with selected of the apertures 35. The end fitting is then moved vertically downwardly so that the projections 22, 23 and 24 enter into the apertures 45 and so that the surface 21 is supported upon the upper surface of the belt rail leg 44. The underside of the first latch member 27 is formed with an arcuate surface 46 so that the latch member will be automatically cammed to a released position by compression of the spring 29. Once the latch member 27 is beneath the belt rail leg 44 the spring 29 will again urge it to a latched position, as shown in FIG. 1. In this position, the latch member 27 prevents vertical movement of the end fitting 12 a distance sufficient for the projections 22, 23 and 24 to become disengaged from the apertures 45.

From the description of FIG. 1 it should be readily apparent that the cooperation of the projections 22, 23 and 24 with the apertures 44 prevent longitudinal and transverse movement of the end fitting 12 relative to the belt rail 13. The latch member 27 prevents vertical movement. In this application, the latch member 33 performs no function. To release the end fitting, the handle portion 31 of the latch member 27 is gripped and the latch member 27 is slid toward a released position by compressing of the spring 29. The end fitting 12 may then be readily detachable from the belt rail 13 through vertical upward movement.

The second type of belt rail 14 (FIG. 4) is of the type sold in the industry under the trade name DF$_2$. The belt rail 42 has a configured shape that includes a first, vertically upstanding flange 51 that is spaced a distance from the side wall 52 of the associated car. An offset portion 53 is formed at the bottom of the portion 51 and is joined in any suitable manner, as by welding or bolting to the side wall 52. Another vertically extending portion 54 is formed at the base of the portion 53, which portion also is spaced a distance from the side wall 52. The portion 54 is formed with a plurality of longitudinally spaced apertures 55. An inwardly extending portion 56 completes the shape of the belt rail 14 and is also joined, as by welding to the side wall 52.

The end fitting 12 attaches to the belt rail 14 by having the projections 22, 23 and 24 received behind the belt rail portion 51 with the surface 21 being supported upon the upper edge of this belt rail portion. This engagement prevents movement of the end fitting 12 transversely relative to the belt rail 14.

The latch mechanism 33 has its pin projections 38 and 39 received in respective pairs of the apertures 55 to lock the end fitting 12 longitudinally of the belt rail 14 and to prevent vertical disengagement. The latch mechanism 33 may be conveniently released by grasping the handle portion 41 and pivoting the latch in a clockwise direction as viewed in FIG. 4 until the pin portions 38 and 39 clear the apertures 55. The end fitting 12 and associated cross bar 18 may then be slid along the belt rail 14 to a new bracing position. Alternatively, the end fitting 12 may be lifted clear of the belt rail 14 for complete disassembly.

It should be readily apparent that the disclosed construction provides a single end fitting which may be used with either one of the two most widely used types of belt rails. Thus, the necessity for providing duplicate equipment is eliminated without any loss in function.

I claim:

1. An end fitting for detachably interconnecting a cross bar of the like interchangeably to a plurality of different type belt rails including a first type of belt rail having a horizontally disposed leg with longitudinally spaced openings and a second type of belt rail having a vertically upstanding portion and a portion formed with longitudinally spaced openings in a vertical face thereof, said end fitting having at least one downwardly extending projection adapted to extend through a selective aperture in the first type of belt rail to fix said end fitting longitudinally and transversely to the first type of belt rail said downwardly extending projection being adapted to extend behind the vertically upstanding projection of the second type of belt rail to fix said end fitting transversely to the second type of belt rail, said end fitting further defining a pocket, a first latch member slidably supported in said pocket for movement between a latched position and a released position, spring means engaging said first latch member for urging said first latch member to its latched position, said first latch member being adapted to underlie the horizontally disposed leg of the first type of belt rail for detachably affixing said end fitting against vertical movement relative to the first type of belt rail, said end fitting having an upstanding portion adjacent its downwardly extending projection, a pivot pin affixed to said upstanding portion, and a second latch member pivotally supported by said pivot pin for movement between a latched position and a released position, said second latch member having a portion adapted to enter into a selected one of the apertures of the second type of belt rail for detachably affixing said end fitting against longitudinal and vertical movement relative to said type of belt rail, said first latch member and said second latch member being supported for movement independent of each other whereby movement of one of said latch members is not accompanied by movement of the other of said latch members, said first latch member having an elongated opening through which a portion of said second latch member extends, said elongated opening being sized to permit movement of either of the said latch members between its respective latched position and released position without corresponding movement of the other latch member.

2. An end fitting as set forth in claim 1 further including biasing spring means engaging said second latch member for urging said second latch member to its latched position.

* * * * *